Feb. 26, 1935.   G. WELTER   1,992,793
WATER TUBE BOX CLOSURE
Filed May 4, 1933

INVENTOR.
GUSTAVE WELTER
BY Chapin & Neal
ATTORNEYS.

Patented Feb. 26, 1935

1,992,793

UNITED STATES PATENT OFFICE 1,992,793

WATER TUBE BOX CLOSURE

Gustave Welter, New Haven, Conn., assignor to The Bigelow Company, New Haven, Conn., a corporation of Connecticut Application May 4, 1933, Serial No. 669,329

2 Claims. (Cl. 137—76)

The production of a readily removable and replaceable plug suitable for tightly closing the openings in the water tube boxes of boilers and similar structures has long been a recognized matter of difficulty. It is necessary in boxes of this character to make provision for getting at the ends of the tubes so that they can be removed and replaced. The ordinary plugs used in closing the holes in the headers opposite the ends of the tubes are difficult to make permanently tight and difficult to remove when access to the tubes is necessary. The plugs are subject to a high pressure from the inside when the boiler is in use, so that an absolutely fluid tight joint is required. Furthermore, the plugs are subjected to steam which has the effect of rusting them so tightly that they cannot be removed, or of injuring the sealing surfaces so that they cannot be replaced with their original tightness after they have once been taken off. It is the object of the present invention to provide an improved closure of this character which will make a tight closure irrespective of the number of times it is taken off and replaced. Another object is to provide a closure of this character in which the securing means are protected from the steam within the boiler. Another object is to provide a closure of this character in which the tightness is enhanced by an increase in internal pressure. Another object is to provide a closure of this character in which the binding of the closure and the friction of the securing means will be relieved at the initial loosening of the plug, thus rendering the removal of the plug extremely easy without detracting from the tightness of the closure. Another object is to provide a closure of great simplicity and cheapness of manufacture. Additional objects will appear from the following description and claims.

The foregoing objects and advantages are, in accordance with the present invention, obtained by very simple expedients which so far as I am aware have never been combined previously in the manner to be described. The sealing surfaces are separated by a gasket which is exposed at one side to the steam, and which is distorted upon the closure of the plug in such a manner that the steam pressure serves to increase its tightness. At the same time, by providing for a distortion of the gasket material when the plug is closed, a sufficient flowing of this material is insured so that it will conform absolutely to the sealing surfaces of the plug and the seat. The necessity for especially accurate machining of these surfaces is thus avoided and the cost of the plug reduced. In order to make the plug at once tighter and more easily removable, it is preferably threaded into the material of the boiler head, the threads being loose fitting so that the plug has some freedom of movement in seeking its seat, and so that the threads will cease to bind after it has been initially loosened. The use of screw threads of this character is possible because of the position and nature of the sealing surfaces by which the threads are protected against the steam. The threads are not in themselves used as a sealing means, but merely as a tightening means to hold the sealing surfaces in proper contact.

The invention will now be described with reference to the accompanying drawing, in which.

Figure 1:
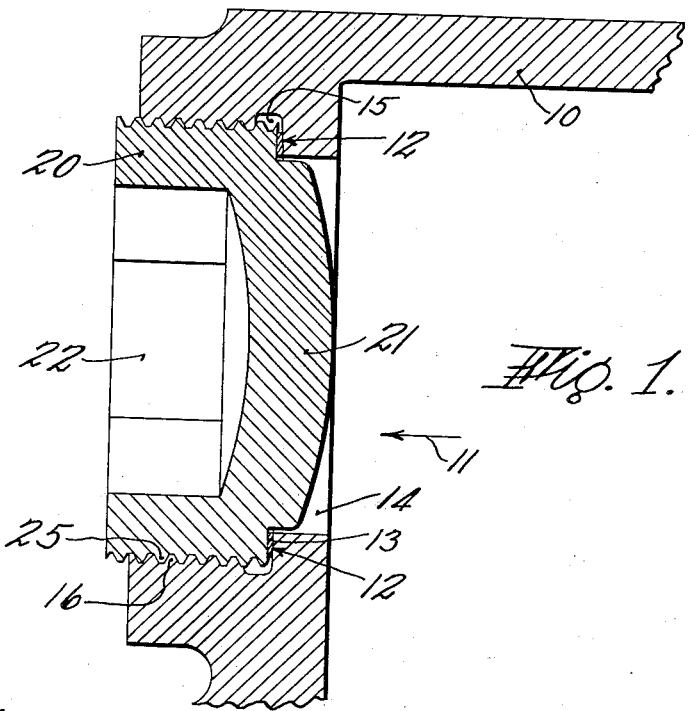
Fig. 1 is a fragmentary section of a water tube box with the improved plug in place.

The water tube box or similar part is shown at 10 and is subjected to high pressure in the direction indicated by the arrow 11. An annular seat 12 is formed in the box 10, serving as one of the sealing surfaces between which the gasket 13 is held. This seat is formed adjacent the bore 14 in the box through which access may be had to the water tubes when the plug is removed. On the outer side of the seat 12 the box 10 is preferably cut away to form a recess 15 which gives room for machining the screw threads 16.

The plug 20 is preferably formed from an alloy steel and has a head 21 crowned towards the side of high pressure. Back of the head 21 the plug is formed with a socket 22 with hexagonal walls to receive a wrench. The head 21 is of slightly smaller size than the bore 14 so that a clearance 23 is provided. A seat 24 is formed on the plug in position to oppose the seat 12, and merges into the external screw threaded surface 25. Screw threads 16 and 25 are made somewhat loose in their fit, as is clearly indicated in the drawing, so that the plug may have a slight free play when it is being screwed into place and so that when once loosened the plug can be readily unscrewed.

Figures 2, 3:
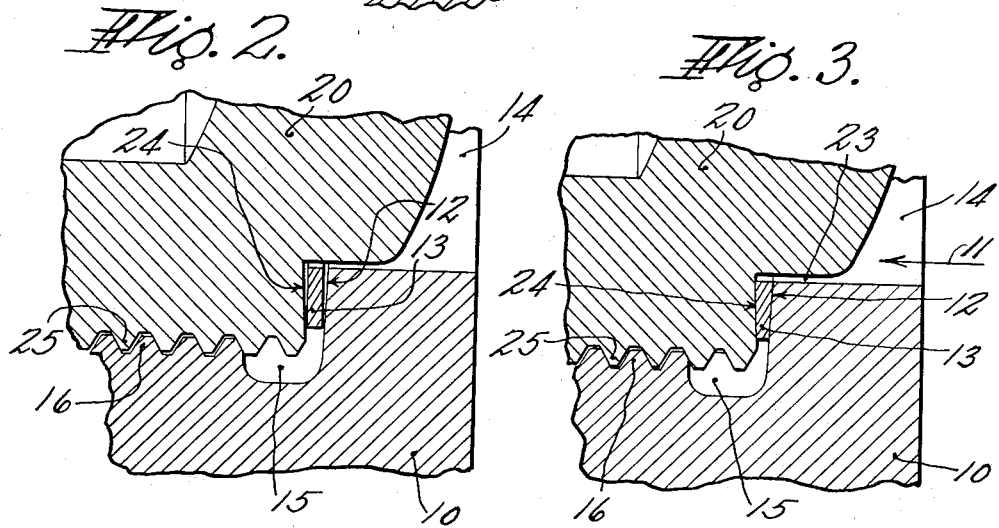
Fig. 2 is a detail, on an enlarged scale and corresponding to a portion of Fig. 1, showing the parts prior to tightening.
Fig. 3 is a detail similar to Fig. 2 showing the parts after tightening.

At least one of the seats 12 and 24, and preferably both, is formed on a taper which may be of the order of one degree. The gasket 13, on the contrary, is initially rectangular in cross section. When the plug is loosely screwed against the gasket the latter will be gripped first against its outer corners, as shown in Fig. 2. As the plug is further screwed up, the gasket which is made of a relatively soft material such as copper, will be progressively distorted into a wedge shaped cross section as shown in Fig. 3, the thickest part of the wedge being towards the higher fluid pressure. In this condition it will be noted that the effect of a fluid pressure coming through the clearance 23 will be to stretch the gasket radially outwardly, forcing it even more tightly into place. As the gasket is being compressed a considerable flowing of its metal necessarily follows, resulting in the gasket taking on exactly the form of the seats and compensating for any irregularities in their surfaces. This effect is assisted by the looseness of the threads 16 and 25, which as pointed out above permit the plug to adjust itself to any irregularities in the seat 12.

The invention has been described in considerable detail in order to facilitate its understanding. Changes in design to suit particular installations can, however, readily be made without departing from the characteristics of the invention as pointed out in the following claims.

What I claim is:

1. A removable closure for affording access to the interior of water tube boxes and the like, comprising an annular seat formed on the box adjacent a bore thereof, screw threads formed on the box externally of the seat, a plug having screw threads engaging relatively loosely the threads on the box and having an annular seat positioned opposite to the seat on the box, said seats converging at a small angle in an outward direction, and a soft metal annular gasket of normally rectangular cross section but compressible by a tightening of the plug into a wedge shaped cross section the thickest portion of which is exposed to the inside of the box.

2. A removable closure for affording access to the interior of water tube boxes and the like, comprising a shouldered bore through the box wall, the shoulder thereof forming a seat facing away from the interior of the box, screw threads formed in the enlarged portion of the bore external to the shoulder, a plug having screw threads engaging the threads in the bore relatively loosely so as to have a small permissible tilting movement in the bore, said plug also having an annular seat positioned opposite to the seat on the box and an extension extending with a small clearance into the smaller portion of the bore, said seats converging at a small angle in a radially outward direction, and a soft metal annular gasket engageable directly between the seat on the plug and the seat on the box and positioned and held against radial displacement by the extension on the plug, the gasket being distortable by the combined turning and radial movement of the plug upon tightening thereof in such a manner as to conform exactly to the surfaces of said seats and to assume a wedge shaped cross section the thickest portion of which is exposed to the inside of the box.

GUSTAVE WELTER.